(12) United States Patent
Sanka et al.

(10) Patent No.: US 8,958,847 B2
(45) Date of Patent: Feb. 17, 2015

(54) METHODS AND APPARATUSES FOR OPTIMIZATION OF MULTIPLE SUBSCRIPTION DEVICE PERFORMANCE

(71) Applicant: QUALCOMM Incorporated, San Diego, CA (US)

(72) Inventors: Suresh Sanka, Hyderabad (IN); Sathish Krishnamoorthy, Hyderabad (IN); Subbarayudu Mutya, Hyderabad (IN); Venkata Appala Naidu Babbadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 13/831,761

(22) Filed: Mar. 15, 2013

(65) Prior Publication Data

US 2013/0303240 A1 Nov. 14, 2013

Related U.S. Application Data

(60) Provisional application No. 61/645,737, filed on May 11, 2012.

(51) Int. Cl.
*H04W 88/02* (2009.01)
*H04W 4/16* (2009.01)
(Continued)

(52) U.S. Cl.
CPC .............. *H04W 4/16* (2013.01); *H04B 1/3816* (2013.01); *H04W 4/001* (2013.01); *H04W 48/12* (2013.01); *H04W 68/00* (2013.01); *H04W 88/06* (2013.01); *H04W 76/048* (2013.01)
USPC ........................................................ 455/558

(58) Field of Classification Search
CPC ... H04W 88/06; H04W 68/02; H04W 76/025; H04W 24/10; H04W 36/00; H04W 36/0094

USPC ........ 455/558, 552.1, 553.1, 426, 434, 435.1, 455/435.2, 458, 436; 370/328–311
See application file for complete search history.

(56) References Cited

U.S. PATENT DOCUMENTS 8,134,977 B2    3/2012  Parekh et al.
2007/0099614 A1* 5/2007  Parekh et al. ................. 455/436
(Continued)

FOREIGN PATENT DOCUMENTS

EP        2533564 A1    12/2012
WO    WO-2007051184 A2    5/2007
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 10)", 3GPP Standard; 3GPP TS 36.331, 3rdGeneration Partnership Project (3GPP), Mobile Competence Centre ; 650, Route Deslucioles ; F-06921 Sophia-Antipolis Cedex; France, vol. RAN WG2, No. V10.5.0, Mar. 13, 2012, pp. 1-302, XP050580020, [retrieved on Mar. 13, 2012] 5.3.11.2;5.3.11.3.

(Continued)

*Primary Examiner* — Diane Mizrahi
(74) *Attorney, Agent, or Firm* — Michael F. Taveira

(57) ABSTRACT

Methods and apparatus of tune away in wireless communications include receiving a master information block (MIB) from a first subscription network entity on a first subscription in a user equipment (UE). The method further includes determining system information block (SIB) scheduling information associated with the first subscription network entity. Moreover, the method includes tuning away from the first subscription to a second subscription.

28 Claims, 7 Drawing Sheets

(51) Int. Cl.
*H04W 4/00* (2009.01)
*H04W 48/12* (2009.01)
*H04W 68/00* (2009.01)
*H04W 88/06* (2009.01)
*H04W 76/04* (2009.01)

(56) References Cited

U.S. PATENT DOCUMENTS

| | | | |
|---|---|---|---|
| 2009/0131054 A1 | 5/2009 | Zhang | |
| 2009/0156257 A1 | 6/2009 | Shi | |
| 2009/0215473 A1* | 8/2009 | Hsu | 455/458 |
| 2009/0239533 A1* | 9/2009 | Somasundaram et al. | 455/434 |
| 2010/0067379 A1* | 3/2010 | Zhao et al. | 370/235 |
| 2011/0319081 A1* | 12/2011 | Deivasigamani et al. | 455/436 |
| 2012/0057525 A1 | 3/2012 | Hou | |
| 2012/0190362 A1 | 7/2012 | Subbarayudu et al. | |
| 2012/0294694 A1* | 11/2012 | Garot | 411/427 |
| 2013/0150013 A1 | 6/2013 | Liu et al. | |
| 2013/0303203 A1 | 11/2013 | Wang et al. | |
| 2014/0112180 A1* | 4/2014 | Axmon et al. | 370/252 |

FOREIGN PATENT DOCUMENTS

| | | |
|---|---|---|
| WO | 2012089596 A1 | 7/2012 |
| WO | 2012140023 A1 | 10/2012 |
| WO | 2012168090 A1 | 12/2012 |

OTHER PUBLICATIONS

International Search Report and Written Opinion—PCT/US2013/040760—ISA/EPO—Oct. 23, 2013.

* cited by examiner

US 8,958,847 B2

METHODS AND APPARATUSES FOR OPTIMIZATION OF MULTIPLE SUBSCRIPTION DEVICE PERFORMANCE

CLAIM OF PRIORITY UNDER 35 U.S.C. §119

The present Application for Patent claims priority to Provisional Application No. 61/645,737 entitled "METHODS AND APPARATUSES FOR OPTIMIZATION OF DSDS DEVICE PAGING PERFORMANCE" filed May 11, 2012, which is assigned to the assignee hereof and hereby expressly incorporated by reference herein.

BACKGROUND

1. Field

Aspects of the present disclosure relate generally to wireless communication systems, and more particularly to processing communications related to multiple subscriptions.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

In some wireless networks, a user equipment (UE) can have multiple subscriptions to one or more networks (e.g., by employing multiple subscriber identity module (SIM) cards or otherwise). Such a UE may include, but is not limited to, a dual-SIM, dual standby (DSDS) device. For example, a first subscription may be a first technology standard, such as Wideband Code Division Multiple Access (WCDMA), while a second subscription may support a second technology standard, such as Global System for Mobile Communications (GSM) Enhanced Data rates for GSM Evolution (EDGE) (also referred to as GERAN). Where the UE utilizes a single transceiver to communicate over the multiple subscriptions and/or networks, the UE can tune the transceiver to a given subscription and/or network during a given period of time to communicate therewith, but can only communicate in a single subscription and/or network at a given period of time. As such, when the UE has an active call with the first subscription, the UE may periodically tune away to the second subscription to monitor signals or acquire a connection. During such tune aways, the UE loses throughput on the active call with the first subscription due to the inability to receive signals corresponding to the first subscription. Further, if the tune away mode persists for a relatively long time, then the network managing the active call of the first subscription may determine that the UE is no longer connected due to lack of activity, and thus may terminate the active call of the first subscription.

Furthermore, a DSDS UE may initially establish an active session on the first subscription, wherein the active session may use a shared radio resource for the majority of the time when the second subscription is in an idle state. Because the device has the second subscription, however, the device may also be required to periodically allow a second subscription to utilize the shared radio resource on the device. Such operation may be referred to as a "tune away" in the DSDS device.

In some situations, such as where the UE reselects a new cell for first subscription service, the UE may receive a master information block (MIB) that contains scheduling information regarding the timing of individual system information blocks (SIB s). The first subscription is often required to receive and decode the SIBs to receive important control information. In legacy systems, these SIB periods sometimes overlap with tune away periods, which may be referred to as "collision" of the two types of periods. Naturally, only one of these two operations may be completed at a given time where there exists a single radio resource, and legacy devices and networks typically prioritize receiving the SIB blocks associated with the first subscription over tune away to the second subscription to ensure that the ongoing data session on the first subscription is maintained. By prioritizing the SIB receive operations to tuning away, the second subscription may not receive pages destined for the second subscription from the second subscription network. As a result, the second subscription may miss one or more calls due to the SIB receive operations trumping tune away. Therefore, improvements in the operation of tune aways are desired.

SUMMARY

In one aspect, a method of tune away in wireless communications includes receiving a master information block (MIB) from a first subscription network entity on a first subscription in a user equipment (UE). The method further includes determining system information block (SIB) scheduling information associated with the first subscription network entity. Moreover, the method includes tuning away from the first subscription to a second subscription.

Another aspect of the disclosure provides an apparatus for tune away in a wireless system including means for receiving a master information block (MIB) from a first subscription network entity on a first subscription in a user equipment (UE). Also, the apparatus includes means for determining system information block (SIB) scheduling information associated with the first subscription network entity. Moreover, the apparatus includes means for tuning away from the first subscription to a second subscription.

In another aspect, a computer program product, comprising a computer-readable medium includes code executable by a computer. For example, computer-readable medium includes code for receiving a master information block (MIB) from a first subscription network entity on a first subscription in a user equipment (UE). The computer-readable medium further includes code for determining system information block (SIB) scheduling information associated with the first subscription network entity. Moreover, the computer-readable medium includes code for tuning away from the first subscription to a second subscription.

Additional aspects provide an apparatus for tune away in wireless communications including at least one processor and a memory coupled to the at least one processor. The at least one processor can be configured to receive a master information block (MIB) from a first subscription network entity on a first subscription in a user equipment (UE). Moreover, the at least one processor can be configured to determine system information block (SIB) scheduling information associated with the first subscription network entity. Also, the at least one processor can be configured to tune away from the first subscription to a second subscription.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure provides methods and apparatuses for improved tune away in multi-SIM devices whereby tune away to a second subscription for receiving a mobile terminated (MT) call or a page associated with such a call may be prioritized over scheduled system information block (SIB) procedures associated with a first subscription based, for example, on a user choosing to prioritize receiving a call on the second subscription over throughput on an active call on the first subscription. Specifically, where a period of cell searching associated with a first subscription overlaps at least partially with a tune away period for use of UE radio resources by a second subscription, the tune away operations may be rescheduled to not overlap with SIB read periods associated with the first subscription as to minimize call or page drops on the second subscription.

Figure 1:
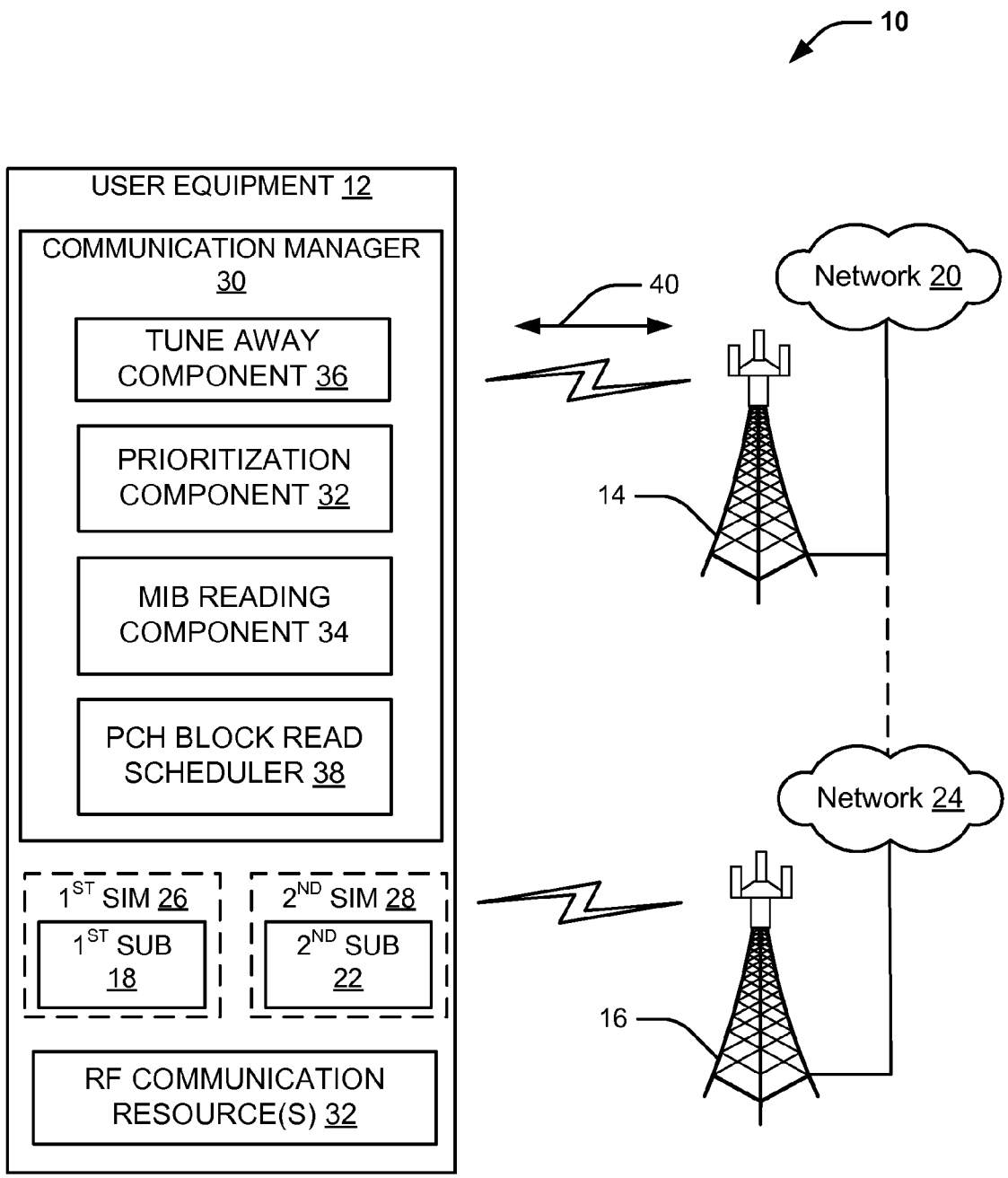
FIG. 1 is a schematic diagram of a communication network including an aspect of a multi-SIM user equipment that may perform tune away based on SIB scheduling information.

Referring to FIG. 1, in one aspect, a wireless communication system 10 includes a user equipment (UE) 12 for prioritizing receiving MT calls associated with a second subscription 22 to SIB read procedures associated with a first subscription 18 to allow the second subscription 22 to receive one or more pages on the second subscription network. For instance, UE 12 can communicate with a first base station 14 and/or a second base station 16 utilizing multiple subscriptions to one or more networks. In an example, UE 12 can have a first subscription 18 related to first network 20 and second subscription 22 related to the same network, such as first network 20, or to a different network, such as second network 24. For instance, each subscription 18 and 22 may relate to a different account and/or different services on the same network or on different networks. In some aspects, each subscription 18 and 22 optionally may be maintained on a respective first subscriber identity module (SIM) 26 and a second SIM 28. As such, in one aspect, UE 12 may be a multi-SIM, multi-standby device, such as a dual-SIM, dual standby (DSDS) device. Accordingly, UE 12 can at least communicate in first network 20 via a first base station 14 using first subscription 18. Moreover, UE 12 can communicate in second network 24 via first base station 14 and/or via a different base station, such as second base station 16, using second subscription 22. Further, first network 20 and second network 24 can use the same or different radio access technologies (RAT) to facilitate communicating with UEs. Additionally, first base station 14 and second base station 16 can each be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access via a subscription at the UE 12.

UE 12 can include a communications manager component 30 configured to manage communication exchange signaling associated with first subscription 18 and/or second subscription 22 via one or more radio frequency (RF) communication resources 32. For example, communications manager component 30 may include and execute communication protocols and/or manage other standards-specific communication procedures using protocol and/or standards-specific instructions and/or subscription-specific configuration information that allows communications with first network 20 and second network 24. Further, RF communication resources 32 are configured to transmit and/or receive the communication exchange signaling to and/or from one or more base stations or other devices in wireless communication system 10. For example, RF communication resources 32 may include, but are not limited to, one or more of a transmitter, a receiver, a transceiver, protocol stacks, transmit chain components, and receive chain components. In some aspects, RF communication resources 32 may be dedicated to operate according to the standards and procedures of a single one of first subscription 18 or second subscription 22 at any given time. For instance, although not to be construed as limiting, RF communication resources 32 may be associated with a multi-SIM, multi-standby device, such as a dual-SIM, dual standby (DSDS) device.

In an aspect, communications manager component 30 may manage multi-network communications to enable mobility of UE 12, e.g. for a handover, and/or to seek to add to or improve communication quality and/or services. In one case, for example, communications manager component 30 may establish an active call 34 using first subscription 18 with one wireless network, for example first network 20, while attempting to acquire and/or maintain communication and/or service using second subscription 22 with the same network or with a different network, such as second network 24. According to an example, communications manager component 30 can establish active call 40 over first network 20, related to first subscription 18, via first base station 14. For instance, UE 12 and base station 14 can establish a connection to facilitate communicating in first network 20. Communications between UE 12 and first base station 14 can occur over logical channels, as described herein for example. UE 12 can activate the call based on requesting call establishment from base station 14, receiving a page for an incoming call from base station 26, etc. Moreover, for example, active call can be a data call (e.g., voice over internet protocol (VoIP) or similar technologies) where the first network 20 is a packet-switched (PS) network, a voice call where first network 20 is a circuit-switched (CS) network, and/or the like.

Figure 2:
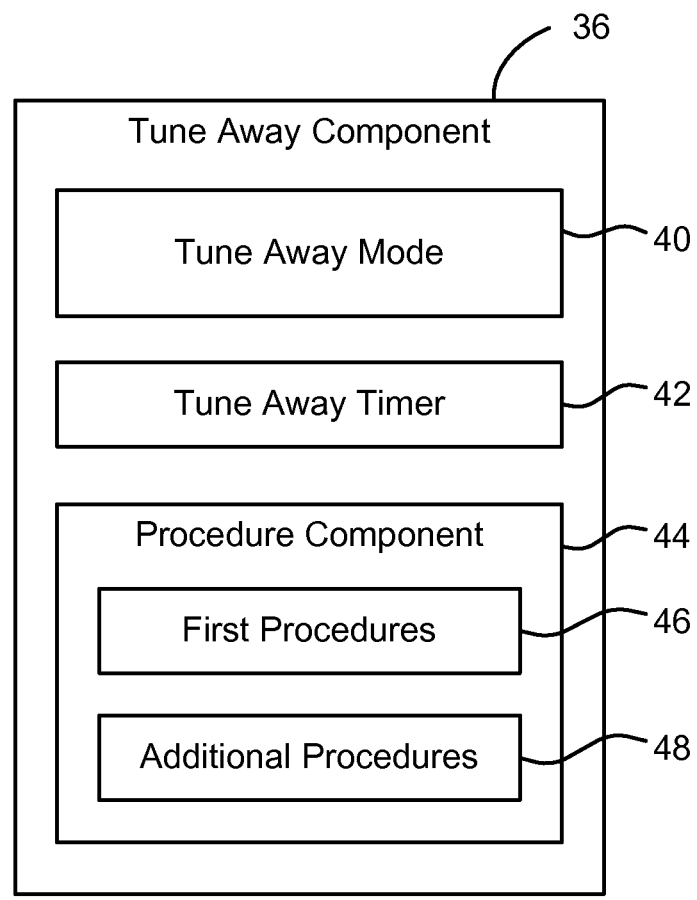
FIG. 2 is a schematic diagram of an aspect of the tune away component of FIG. 1.

In an additional aspect, referring to FIG. 2, communication manager component 30 may also include a tune away component 36 configured to manage switching RF communication resources 32 from operating on active call 40 according to first subscription 18 to operating according to second subscription 22 to acquire and/or maintain communication and/or service with the same or with a different network. For example, tune away component 36 may maintain a periodic tune away timer 42 and, upon expiration of the tune away timer 42, is configured to change operation of RF communication resources 32 and trigger communications manager 30 to communicate according to second subscription 22. The execution of such a tune away, and the subsequent procedures, may be referred to as operating in a tune away mode 40. For instance, tune away component 36 causes RF communication resources 32 to switch or re-initialize an operating state, such as from a first subscription operating state (e.g., for a first network communication or service, like WCDMA communication) supporting active call 34 to a second subscription operating state (e.g., for a different first network service or for a different second network communication, like GSM communication). As such, initiating the tune away mode 40 may include, but is not limited to, one or more operations with respect to RF communication resources 32, such as performing a wake-up of the second subscription operating state, setting up a corresponding protocol stack for processing signals and data, enabling second subscription-related clocks, RF tuning including changing a receive and/or transmit frequency or frequency range of a transmitter or receiver or transceiver, and any other overhead procedure to enable communication using second subscription 22. Further, once the second subscription operating state is enabled, tune away component 36 can be configured to cause UE 12 and/or communication manager component 30 to perform, using second subscription 22, one or more procedures in the network, such as but not limited to page demodulation, idle mode monitoring procedures, periodic cell/location/routing updates, cell reselections, etc.

In one example, tune away component 36 initiates tune away mode 40 to communicate with a network different than the network supporting active call 34, e.g. second network 24, via second base station 28. As such, tune away component 36 enables RF communication resources 32 to determine whether idle-mode signals are received during the tune away mode 40 from second base station 28 corresponding to second network 24. Idle-mode signals can relate to substantially any signal broadcast in the network, e.g. second network 24, such as paging signals, broadcast control channel (BCCH) signals, or other signals that can correlate to mobility of UE 12 or otherwise. Further, tune away component 36 may utilize procedure component 44 to store or otherwise perform one or more procedures based on received signals from another component or subcomponent of the UE 12, or a received communication signal from the network including state information. As such, tune away component 36 enables UE 12 to perform at least a first procedure or a first set of procedures 46, including idle-mode procedures such as page demodulation. Additionally, depending on a state of communications and/or movement of UE 12 or whether idle-mode signals are received, tune away component 36 enables UE 12 to perform additional procedures 48, such as but not limited to received signal processing (e.g. determining if a received page relates to second subscription 22 and optionally responding if so), periodic cell/location/routing updates, cell reselections, etc.

It should be noted that such additional procedures may take a relatively long period of time, such as a period of time longer than an inactivity timer corresponding to active call 34 of first subscription 18.

Figure 3:
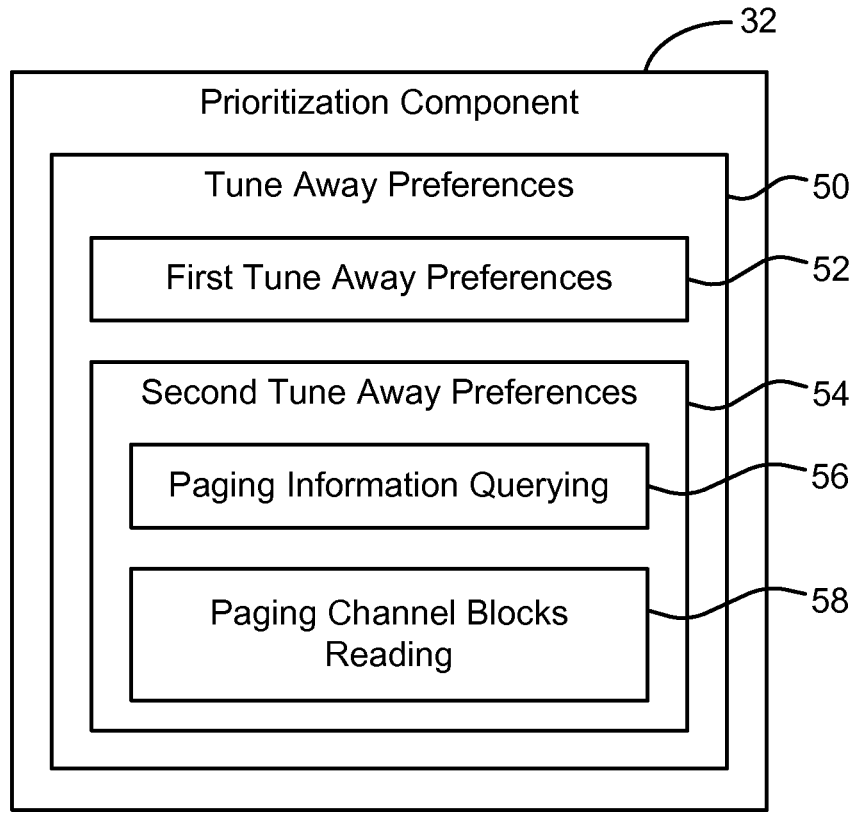
FIG. 3 is a schematic diagram of an aspect of the prioritization component of FIG. 1.

In a further aspect, referring to FIG. 3, communication manager 30 may include a prioritization component 32, which may be configured to prioritize tune away to a second subscription to receive MT calls or pages on UE 12 over procedures associated with improving throughput of an existing call on a first subscription on UE 12. For example, the prioritization component 32 may initiate tune away preferences component 50 to set a preference for receiving one or more mobile terminated calls over existing call throughput. In an aspect, the first tune away preferences component 52 may set first tune away preferences 52 and second tune away preferences 58. In some cases, the first tune away preferences 52 may prioritize first subscription procedures (e.g., first procedures 46, FIG. 2) over second subscription procedures (e.g., additional procedures 48, FIG. 2). In other cases, the second tune away preferences 54 may prioritize second subscription procedures (e.g., additional procedures 48, FIG. 2) over first subscription procedures (e.g., first procedures 46, FIG. 2). Further, the second tune away preferences 54 include, but are not limited to, paging information querying 56 and paging channel block reading 58. For instance, paging information querying 56 may enable querying of one or more second subscription entities (e.g., network 24, FIG. 1) for paging information during a period determined by the MIB reading component 34. Additionally, in some aspects, the user may select either the first tune away preferences 52 or the second tune away preferences 54 during UE 12 operation. The selection of such tune away preferences provides the various components and/or sub-components of the UE 12 with operating parameter characteristics. In other words, based on the preference selection, the UE 12 may be configured to prioritize tune away to a second subscription (e.g., second subscription 22, FIG. 1) to receive MT calls or pages on UE 12 over procedures associated with improving throughput of an existing call on a first subscription (e.g., first subscription 18, FIG. 1). It should be understood that prioritization component 32 may receive or otherwise determine a preference selection from any number of non-limiting sources, such as one or more networks (e.g., networks 20 and 24, FIG. 1), users, and/or an autonomous algorithm stored in the UE 12 automatically executing the functionalities described herein.

Figure 4:
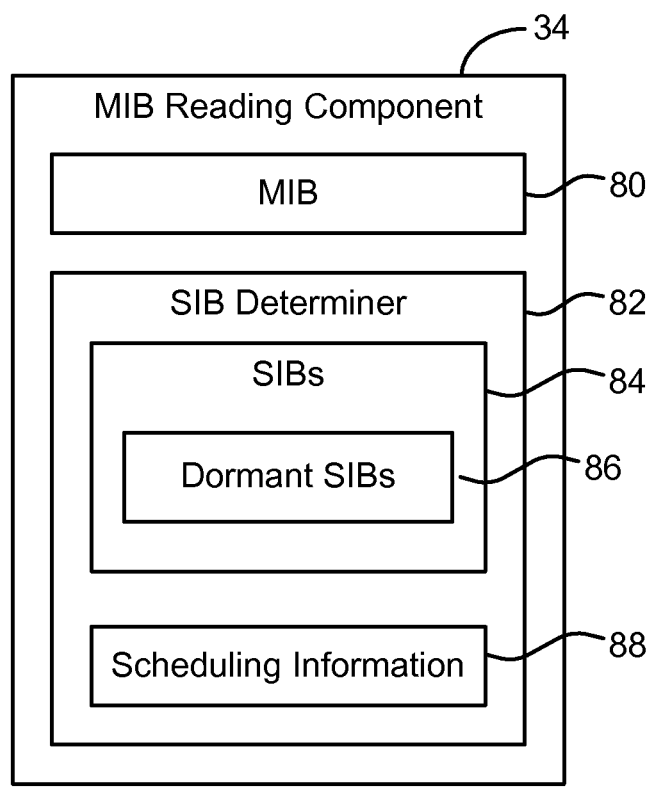
FIG. 4 is a schematic diagram of an aspect of the MIB reading component of FIG. 1.

Furthermore, referring to FIG. 4, communication manager 30 may, in an aspect, include MIB reading component 34, which may be configured to receive, decode, and read a MIB 80 received from a network entity. In an additional aspect, MIB reading component 34 may determine SIB scheduling information 88 from the MIB 80. In other words, the MIB reading component 34 may discern when a network component will transmit SIBs 84 so that radio resources may be held by the first subscription (e.g., first subscription 18, FIG. 1) during these SIB periods to ensure receipt of important cell information therein. Further, the MIB reading component 34 may include SIB determiner 82, which may be configured to analyze the MIB 80 to determine dormant SIBs 86. For instance, SIB determiner 82 may utilize the scheduling information 88 from the MIB 80 received from the network (e.g., networks 20 and 24, FIG. 1) to determine the dormant SIBs 86. The dormant SIBs 86 may be periods in which an absence of scheduling information is identified. That is, using the scheduling information 88, the SIB determiner 82 searches for dormant SIBs 86 Accordingly, during such dormant SIBs 86 periods, tune away operations may be scheduled for the second subscription 22 to not overlap with SIB read periods associated with the first subscription 18 so as to minimize call or page drops on the second subscription 22. Furthermore, by searching for dormant SIBs, the UE 12 may efficiently allocate radio resources based on open periods rather than overlap scheduled periods. In some aspects, the MIB reading component 34 may provide the dormant SIBs 86 to the PCH block read scheduler 38 for second subscription scheduling purposes.

In an additional aspect, communication manager may include a PCH block read scheduler 38, which may be configured to arrange a schedule for handing over the DSDS UE radio resources to the second subscription (e.g., second subscription 22, FIG. 1) to coincide with one or more dormant SIB periods 86, which may correspond to periods during which the first subscription (e.g., first subscription 18, FIG. 1) is not scheduled to receive and/or read an SIB. In an aspect, PCH block read scheduler 38 may reschedule PCH block reads around SIB periods of the first subscription where a user has indicated that receiving MT calls on the second subscription is a higher priority than increased throughput on the first subscription.

Figure 5:
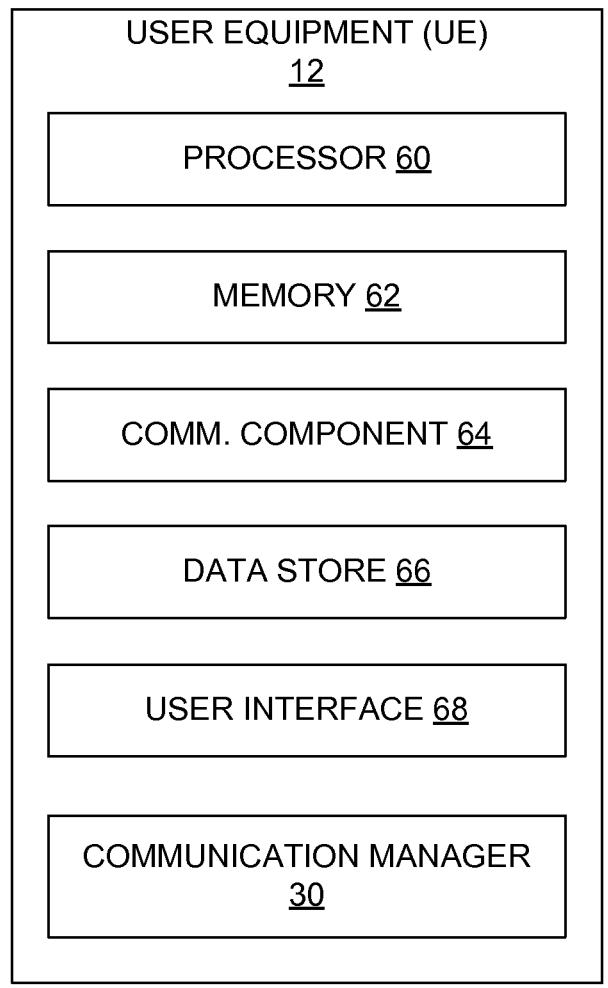
FIG. 5 is a schematic diagram of an aspect of the user equipment of FIG. 1.

Referring to FIG. 5, in one aspect, UE 12 may include a specially programmed or configured computer device. UE 12 includes a processor 60 for carrying out processing functions associated with one or more of components and functions described herein. Processor 60 can include a single or multiple set of processors or multi-core processors. Moreover, processor 60 can be implemented as an integrated processing system and/or a distributed processing system. Additionally, processor 60 may be configured to perform the functions described herein related to tune away collision avoidance in multi-SIM UEs.

UE 12 further includes a memory 62, such as for storing data used herein and/or local versions of applications being executed by processor 60. Memory 62 can include any type of memory usable by a computer, such as random access memory (RAM), read only memory (ROM), tapes, magnetic discs, optical discs, volatile memory, non-volatile memory, and any combination thereof. Additionally, memory 62 may be configured to store data and/or code or computer-readable instructions for performing the functions described herein related to tune away collision avoidance in multi-SIM UEs.

Further, UE 12 includes a communications component 64 that provides for establishing and maintaining communications with one or more entities utilizing one or more of hardware, software, and services as described herein. Communications component 64 may carry communication signals between components on UE 12, as well as exchanging communication signals between UE 12 and external devices, such as devices located across a wired or wireless communications network and/or devices serially or locally connected to UE 12. For example, communications component 64 may include one or more buses, and may further include transmit chain components and receive chain components associated with a transmitter and receiver, respectively, or a transceiver, operable for interfacing with external devices. In an additional aspect, communications component 64 may be configured to perform the functions described herein related to tune away collision avoidance in multi-SIM UEs.

Additionally, UE 12 may further include a data store 66, which can be any suitable combination of hardware and/or software, that provides for mass storage of information, databases, and programs employed in connection with aspects described herein. For example, data store 66 may be a data repository for applications and data not currently being executed by processor 60, such as those related to the aspect described herein.

UE 12 may additionally include a user interface component 68 operable to receive inputs from a user of UE 12, and further operable to generate outputs for presentation to the user. User interface component 68 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 68 may include one or more output devices, including but not limited to a display, a speaker, a haptic feedback mechanism, a printer, any other mechanism capable of presenting an output to a user, or any combination thereof.

Additionally, UE 12 may include communication manager component 30, such as in specially programmed computer readable instructions or code, firmware, hardware, one or more processor modules, or some combination thereof.

Figure 6:
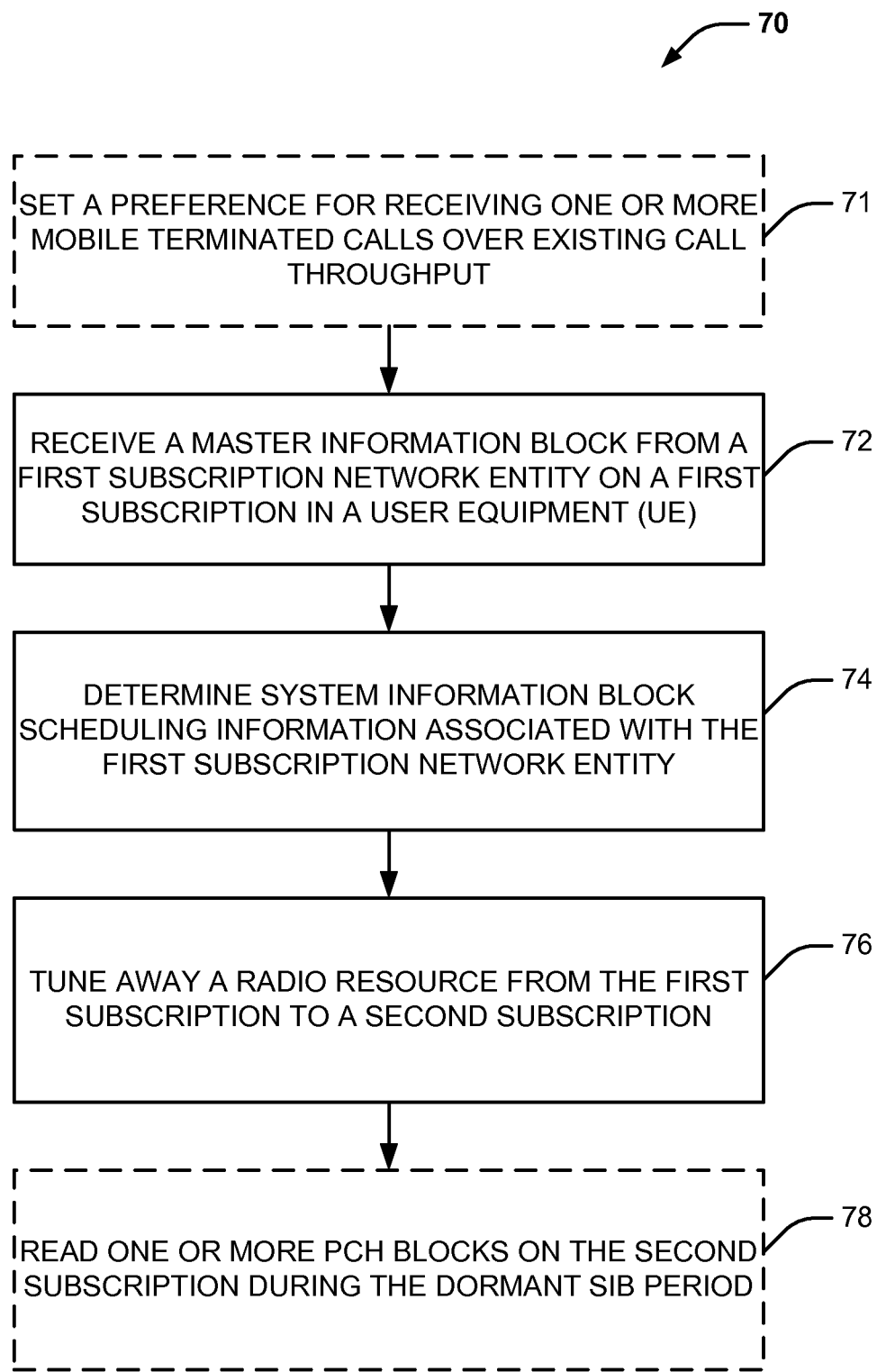
FIG. 6 is a flowchart of an aspect of a method of page performance optimization in a multi-SIM user equipment.

Referring to FIG. 6, in operation, a UE such as UE 12 (FIG. 1) may perform one aspect of a method 70 for improved tune away in DSDS devices. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 71, a UE may optionally set a preference for receiving one or more mobile terminated calls, for example, on a second subscription, over existing call throughput, for example, on a first subscription. For example, as described herein, the communication manager 30 may execute the prioritization component 32 (FIG. 3) to set a preference for receiving one or more mobile terminated calls on a second subscription 22 over existing call throughput on a first subscription 18. The prioritization component 32 may set first tune away preferences 52 and/or second tune away preferences 54. In some cases, the first tune away preferences 52 prioritize first subscription procedures over second subscription procedures. In other cases, the second tune away preferences 54 prioritize second subscription procedures to first subscription procedures.

Furthermore, at block 72, the UE may receive an MIB from a first subscription network entity on a first subscription in the UE. For example, the UE 12 may execute RF communication resources 32 (FIG. 1) to receive an MIB from a first subscription network entity (e.g., network 20, FIG. 1) on a first subscription (e.g., first subscription 18, FIG. 1).

In addition, at block 74, the UE may determine SIB scheduling information associated with the first subscription network entity. For example, as described herein, the communication manager 30 may execute the MIB reading component 32 (FIG. 4) to determine SIB scheduling information 88 associated with the first subscription entity (e.g., first subscription 18, FIG. 1). In some aspects, determining SIB scheduling information 88 associated with the first subscription network entity comprises determining SIB scheduling information 88 from the MIB 80. The MIB reading component 34 may provide the dormant SIBs 86 to the PCH block read scheduler 38 for PCH block read scheduling. In other aspects, the MIB reading component 34 may schedule one or more second subscription 22 procedures during the dormant SIBs 88.

Additionally, at block 76, the UE may tune away from the active call on the first subscription. For example, as described herein, the communication manager 30 may execute tune away component 36 (FIG. 1) to tune away from the active call 40 on the first subscription 18. In some aspects, the UE 12 may tune away from the active call 40 on the first subscription 18 during a dormant SIB period 86 derived from the SIB scheduling information 88.

Furthermore, at block 78, the UE may optionally read one or more PCH blocks on the second subscription during the dormant SIB period. For example, as described herein, the communication manager 30 (FIG. 1) may execute PCH block read scheduler 38 to read one or more PCH blocks on the second subscription 22 during the dormant SIB period 86. Moreover, the UE may also query a second subscription network entity for paging information during the dormant SIB period. For example, as described herein, the communication manager 30 may execute one or more subcomponents to query a second subscription network entity (e.g., network 24, FIG. 1) for paging information during the dormant SIB period 86.

Figure 7:
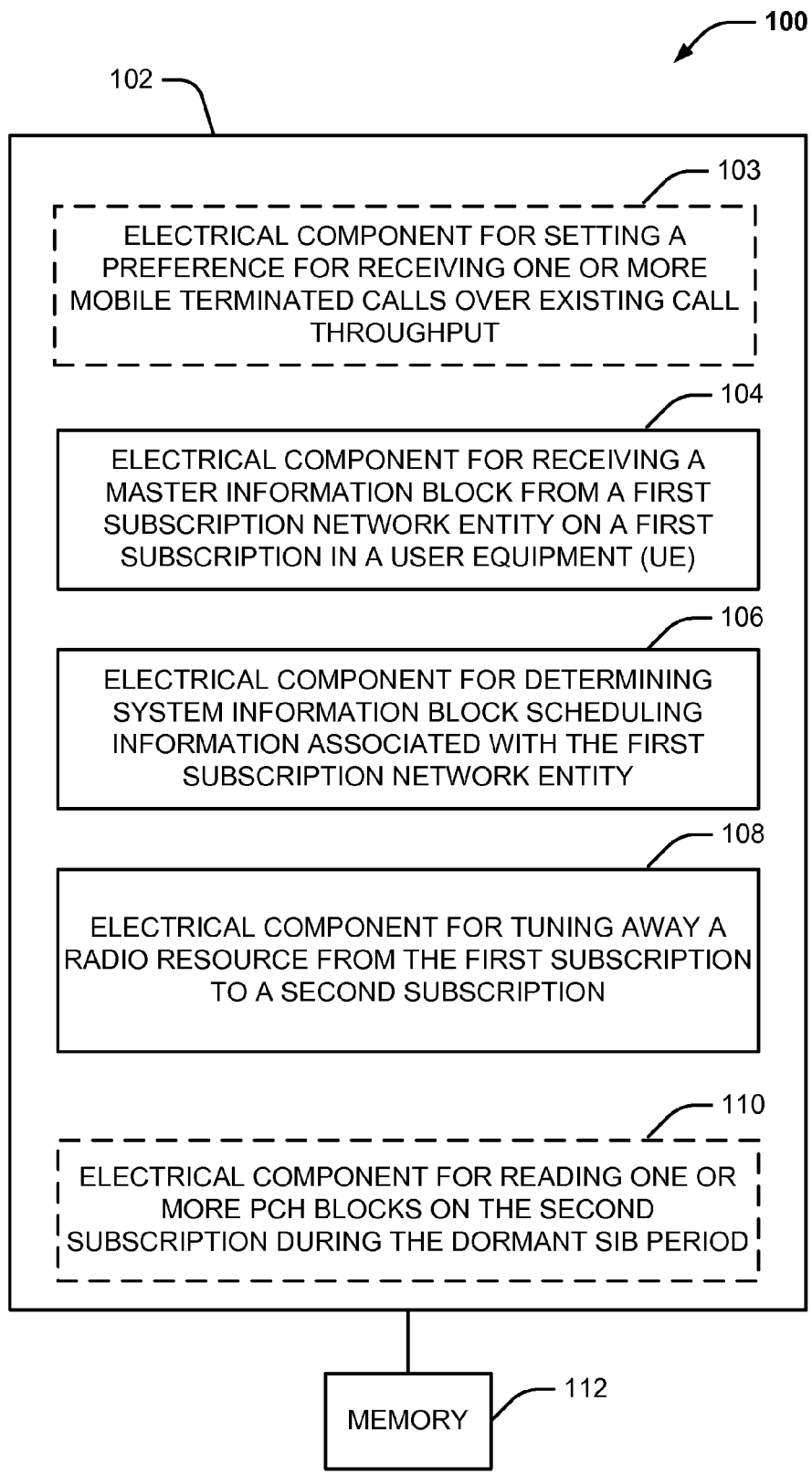
FIG. 7 is a schematic diagram of an aspect of a system for improved tune away and page performance in a multi-SIM user equipment.

Referring to FIG. 7, an example system 100 is displayed for improved tune away in a DSDS UE. For example, system 100 can reside at least partially within a user equipment, such as UE 12 (FIG. 1). It is to be appreciated that system 100 is represented as including functional blocks, which can be functional blocks that represent functions implemented by a processor, software, or combination thereof (e.g., firmware). System 100 includes a logical grouping 102 of electrical components that can act in conjunction. For instance, logical grouping 102 can optionally include an electrical component 103 for setting a preference for receiving one or more mobile terminated calls, for example, on a second subscription, over existing call throughput, for example, on a first subscription. In an aspect, electrical component 103 may include prioritization component 32 (FIGS. 1 and 2). Furthermore, logical grouping 102 can include an electrical component 104 for receiving an MIB from a first subscription network entity on a first subscription in the UE. In an aspect, electrical component 104 may include MIB reading component 34 (FIGS. 1 and 3) and/or communications component 64 (FIG. 5). In addition, logical grouping 102 can include an electrical component 106 for determining SIB scheduling information associated with the first subscription network entity. In an aspect, electrical component 106 may include MIB reading component 34 (FIG. 1). Additionally, logical grouping 102 can include an electrical component 108 for tuning away a radio resource from the first subscription to a second subscription during a dormant SIB period deciphered from the SIB scheduling information. In an aspect, electrical component 108 may include tune away component 36 (FIG. 1). Additionally, logical grouping 102 can include an optional electrical component 110 for reading one or more PCH blocks on the second subscription during the dormant SIB period. In an aspect, electrical component 110 may include processor 60 and/or communications component 64 (FIG. 5). In one example, electrical components 103, 104, 106, 108, and 110 can comprise at least one processor, or each electrical component 103, 104, 106, 108, and 110 can be a corresponding module of at least one processor. Moreover, in an additional or alternative example, electrical components 103, 104, 106, 108, and 110 can be a computer program product including a computer readable medium, where each electrical component 103, 104, 106, 108, and 110 can be corresponding code or instructions.

Additionally, system 100 can include a memory 112 that retains instructions for executing functions associated with the electrical components 103, 104, 106, 108, and 110, stores data used or obtained by the electrical components 103, 104, 106, 108, and 110, etc. While shown as being external to memory 112, it is to be understood that one or more of the electrical components 103, 104, 106, 108, and 110 can exist within memory 112.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM , etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method of tune away in wireless communications, comprising:
    receiving a master information block (MIB) from a first subscription network entity on a first subscription in a user equipment (UE);
    determining, from the MIB, system information block (SIB) scheduling information associated with the first subscription network entity;
    determining, based at least in part on the SIB scheduling information, one or more dormant SIB periods during which no scheduling information related to the first subscription is sent; and
    tuning away from the first subscription to a second subscription during at least one dormant SIB period of the one or more dormant SIB periods to receive paging information from one or more second subscription network entities.

2. The method of claim 1, further comprising reading one or more paging channel (PCH) blocks on the second subscription during the at least one dormant SIB period.

3. The method of claim 1, further comprising setting a preference for receiving one or more mobile terminated calls, on the second subscription, over existing call throughput on the first subscription.

4. The method of claim 3, wherein setting the preference for receiving one or more mobile terminated calls over existing call throughput comprises setting a first tune away preference or a second tune away preference.

5. The method of claim 4, wherein the first tune away preference prioritizes first subscription procedures over second subscription procedures.

6. The method of claim 4, wherein the second tune away preference prioritizes second subscription procedures to first subscription procedures.

7. The method of claim 1, further comprising querying a second subscription network entity for the paging information during the at least one dormant SIB period.

8. The method of claim 1, wherein tuning away from the first subscription to the second subscription comprises tuning away one or more radio resources.

9. An apparatus for tune away in a wireless system, comprising:
- means for receiving a master information block (MIB) from a first subscription network entity on a first subscription in a user equipment (UE);
- means for determining, based on the MIB, system information block (SIB) scheduling information associated with the first subscription network entity;
- means for determining, based at least in part on the SIB scheduling information, one or more dormant SIB periods during which no scheduling information related to the first subscription is sent; and
- means for tuning away from the first subscription to a second subscription during at least one dormant SIB period of the one or more dormant SIB periods to receive paging information from one or more second subscription network entities.

10. The apparatus of claim 9, further comprising means for reading one or more paging channel (PCH) blocks on the second subscription during the at least one dormant SIB period.

11. The apparatus of claim 9, further comprising means for setting a preference for receiving one or more mobile terminated calls, on the second subscription, over existing call throughput on the first subscription.

12. A computer program product, comprising:
- a non-transitory computer-readable medium comprising code for:
  - receiving a master information block (MIB) from a first subscription network entity on a first subscription in a user equipment (UE);
  - determining, based on the MIB, system information block (SIB) scheduling information associated with the first subscription network entity;
  - determining, based at least in part on the SIB scheduling information, one or more dormant SIB periods during which no scheduling information related to the first subscription is sent;and
  - tuning away from the first subscription to a second subscription during at least one dormant SIB period of the one or more dormant SIB periods to receive paging information from one or more second subscription network entities.

13. The computer program product of claim 12, wherein the computer-readable medium further comprises code for reading one or more paging channel (PCH) blocks on the second subscription during the at least one dormant SIB period.

14. The computer program product of claim 12, wherein the computer-readable medium further comprises code for setting a preference for receiving one or more mobile terminated calls, on the second subscription, over existing call throughput on the first subscription.

15. The computer program product of claim 14, wherein setting the preference for receiving one or more mobile terminated calls over existing call throughput comprises setting a first tune away preference or a second tune away preference.

16. The computer program product of claim 15, wherein the first tune away preference prioritizes first subscription procedures over second subscription procedures.

17. The computer program product of claim 15, wherein the second tune away preference prioritizes second subscription procedures to first subscription procedures.

18. An apparatus for tune away in wireless communications, comprising:
- at least one processor; and
- a memory coupled to the at least one processor, wherein the at least one processor is configured to:
  - receive a master information block (MIB) from a first subscription network entity on a first subscription in a user equipment (UE);
  - determine, based on the MIB, system information block (SIB) scheduling information associated with the first subscription network entity;
  - determine, based at least in part on the SIB scheduling information, one or more dormant SIB periods during which no scheduling information related to the first subscription is sent; and
  - tune away from the first subscription to a second subscription during at least one dormant SIB period of the one or more dormant SIB periods to receive paging information from one or more second subscription network entities.

19. The apparatus of claim 18, wherein the at least one processor is further configured to read one or more paging channel (PCH) blocks on the second subscription during the at least one dormant SIB period.

20. The apparatus of claim 18, wherein the at least one processor is further configured to set a preference for receiving one or more mobile terminated calls, on the second subscription, over existing call throughput on the first subscription.

21. The apparatus of claim 20, wherein to set the preference for receiving one or more mobile terminated calls over existing call throughput, the at least one processor is further configured to set a first tune away preference or a second tune away preference.

22. The apparatus of claim 21, wherein the first tune away preference prioritizes first subscription procedures to second subscription procedures.

23. The apparatus of claim 21, wherein the second tune away preference prioritizes second subscription procedures to first subscription procedures.

24. The apparatus of claim 18, wherein the at least one processor is further configured to query a second subscription network entity for paging information during the at least one dormant SIB period.

25. The apparatus of claim 18, wherein to tune away from the first subscription to the second subscription, the at least one processor is further configured to tune away one or more radio resources.

26. The apparatus of claim 11, wherein the means for setting sets the preference for receiving one or more mobile terminated calls over existing call throughput at least in part by setting a first tune away preference or a second tune away preference.

27. The apparatus of claim 26, wherein the first tune away preference prioritizes first subscription procedures over second subscription procedures.

28. The apparatus of claim 26, wherein the second tune away preference prioritizes second subscription procedures to first subscription procedures.

* * * * *